United States Patent [19]
Hoffmann, Sr.

[11] Patent Number: 5,620,768
[45] Date of Patent: Apr. 15, 1997

[54] REPAIR PATCH AND METHOD OF MANUFACTURING THEREOF

[75] Inventor: Dennis Hoffmann, Sr., Palatine, Ill.

[73] Assignee: Pro Patch Systems, Inc., Ill.

[21] Appl. No.: 555,300

[22] Filed: Nov. 8, 1995

Related U.S. Application Data

[63] Continuation-in-part of Ser. No. 136,147, Oct. 15, 1993, abandoned.

[51] Int. Cl.⁶ .............................. B32B 3/02; B32B 35/00
[52] U.S. Cl. ................... 428/77; 52/514; 156/94; 156/250; 156/290; 428/40.1; 428/41.1; 428/41.7; 428/63; 428/78; 428/138; 428/194; 428/217; 428/220; 428/354; 442/23
[58] Field of Search ................... 428/40.1, 40.9, 428/41.1, 41.7, 63, 77, 78, 137, 138, 194, 217, 220, 247, 255, 256, 285, 344, 354; 52/514; 156/94, 250, 290

[56] References Cited

U.S. PATENT DOCUMENTS

| | | | |
|---|---|---|---|
| 4,135,017 | 1/1979 | Hoffmann, Sr. | 428/78 |
| 4,707,391 | 11/1987 | Hoffmann, Sr. | 428/63 |
| 4,732,633 | 3/1988 | Pokorny | 156/94 |
| 5,075,149 | 12/1991 | Owens et al. | 428/138 |
| 5,298,099 | 3/1994 | Hoffmann, Sr. | 156/94 |

*Primary Examiner*—Nasser Ahmad
*Attorney, Agent, or Firm*—Baker & McKenzie

[57] ABSTRACT

An improved multi-layer repair patch is provided. The patch has general repair applications including uses on drywall and automobile bodies. The preferred embodiment includes a three layer patch including an inner mesh, a middle reinforcing sheet and an outer mesh. No glue or adhesive needs to be applied to the middle sheet. The inner surface of the inner mesh carries an adhesive coating and the inner surface of the outer mesh carries an adhesive coating. The inner mesh is attached to the surface under repair and the outer mesh secures the middle sheet between the two mesh structures. In the preferred embodiment, the middle sheet is perforated and the perforated middle sheet, in combination with the inner and outer mesh structures enables liquified bonding material to migrate through the patch during the repair process.

18 Claims, 2 Drawing Sheets

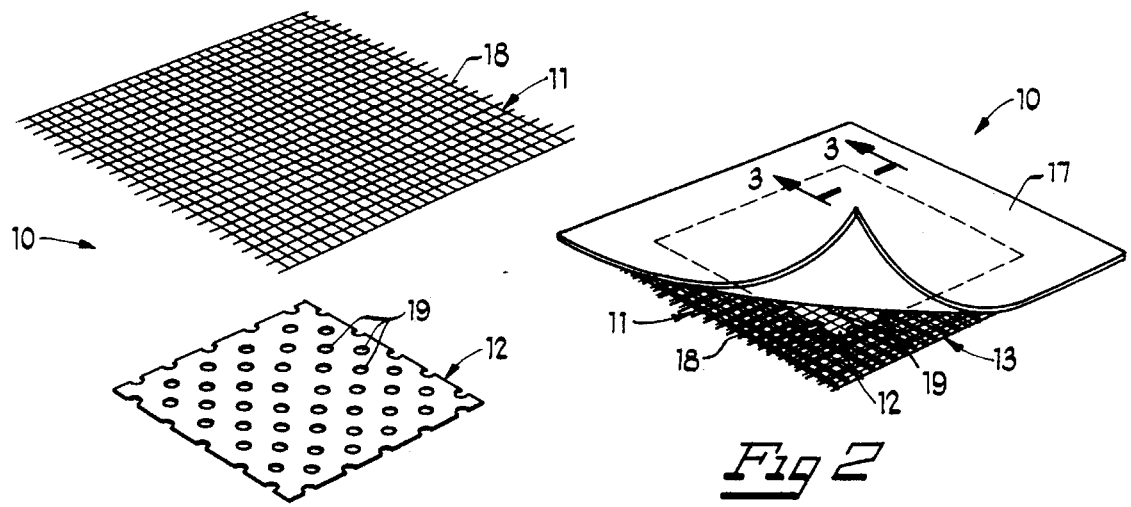
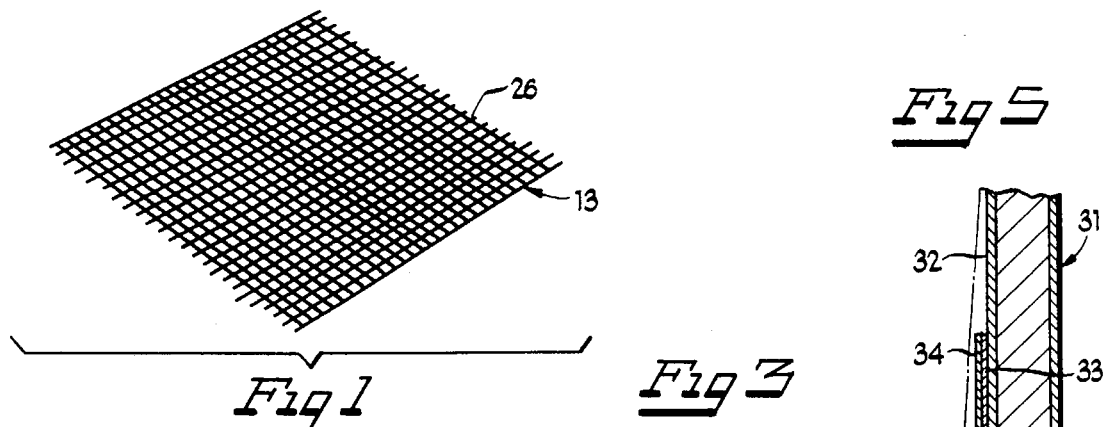
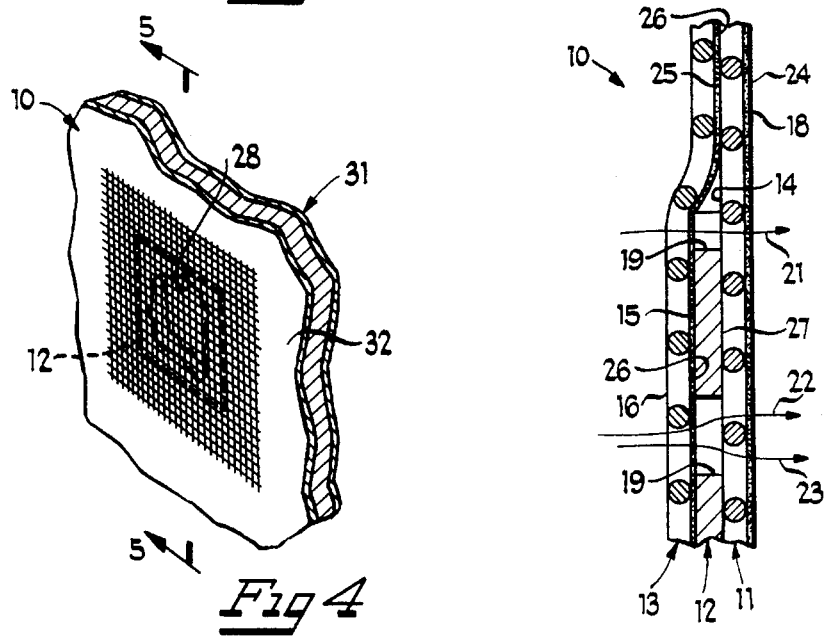
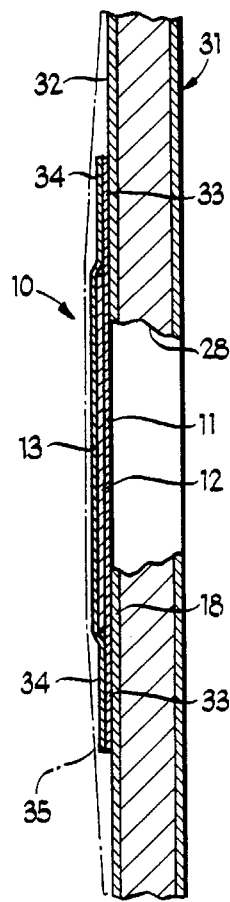

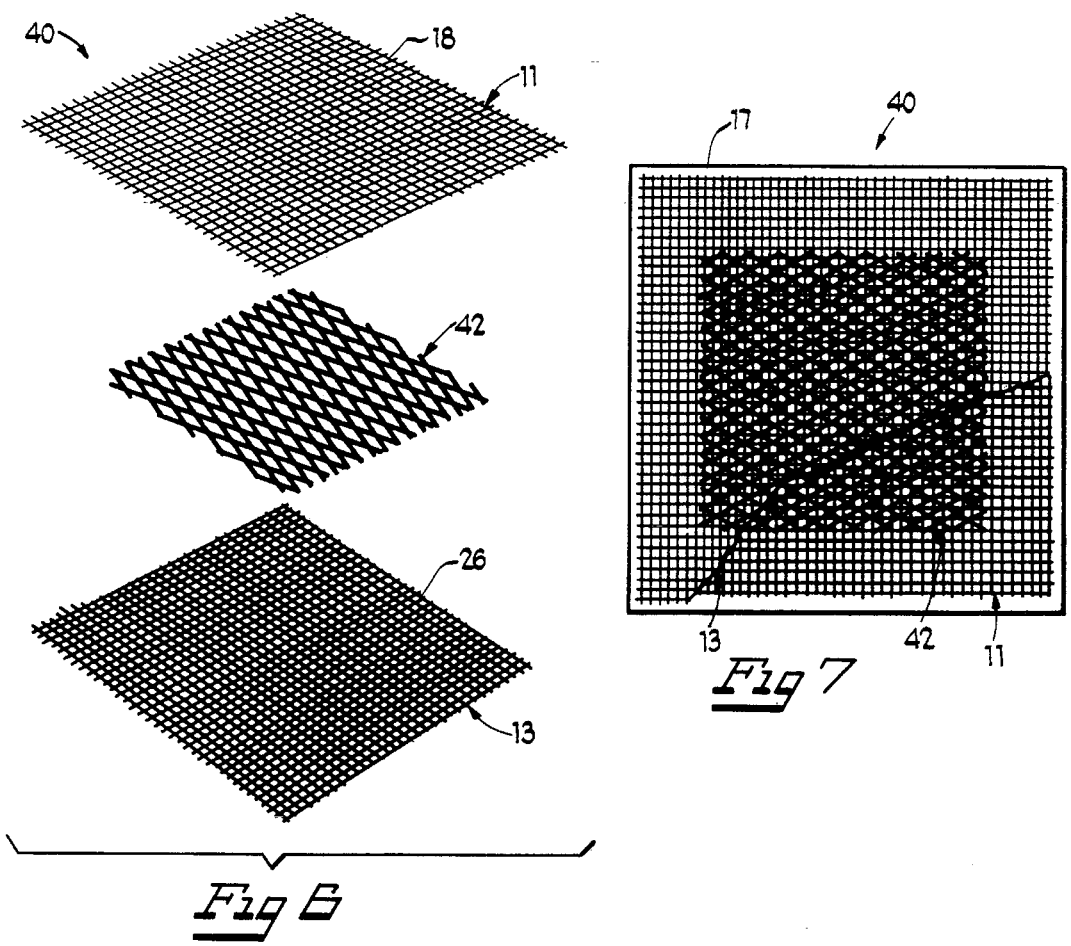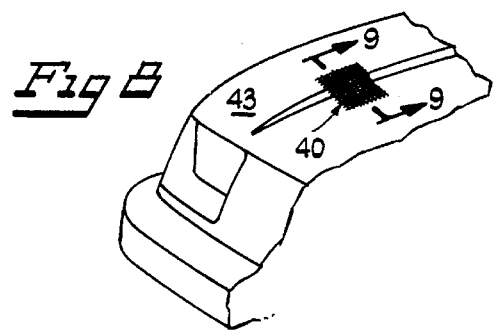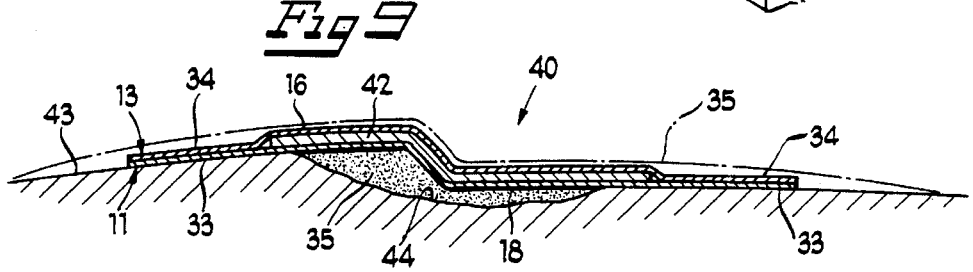

REPAIR PATCH AND METHOD OF MANUFACTURING THEREOF

This is a continuation-in-part of application Ser. No. 08/136,147, filed Oct. 15, 1993 now abandoned.

FIELD OF THE INVENTION

This invention relates generally to an improved means for repairing a wall structure. The improved patch provided by the present invention consists of a flexible and deformable sheet, preferably made of thin metal, disposed between an inner mesh and an outer mesh. The inner mesh is coated with adhesive that enables the patch to stick to the surface to be repaired. The outer mesh also is coated with adhesive thereby attaching the sheet to the inner mesh and holding it in place. The sheet is preferably perforated enabling bonding materials such as vehicle repair bonding material or drywall mud to pass through both the inner and outer mesh as well as the sheet.

BACKGROUND OF THE INVENTION

Multi-layered repair patches are known in the art and these repair patches have been used both for repairing holes in drywall material as well as repairing holes in automobile bodies. U.S. Pat. Nos. 5,075,149 issued to Owens et al. ("Owens"), 4,707,391 issued to Hoffmann ("Hoffmann '391") and 4,135,017 issued to Hoffmann ("Hoffmann '017") are all directed to multi-layer repair patches.

Owens discloses a three-layered patch with a metal plate disclosed between two polyester sheets. The metal plate is held in place between the two polyester sheets with a semi-solid adhesive such as urethane. The semi-solid adhesive fixedly attaches the two polyester sheets together as well as fixedly attaching the reinforcing metal plate between the two sheets. Owens is not useful for repairs which require the application of bonding material or plaster to the repair patch because the bonding material or plaster cannot readily pass through the mesh due to the presence of the urethane adhesive.

Hoffmann '391 discloses a two-layer patch including a perforated metal plate with an outer fiberglass mesh attached to one side of the plate. A glue or adhesive coating is applied to the surface of the plate that is attached to the surface to be repaired and an additional adhesive coating is applied to the inward-facing surface of the fiberglass mesh to attach the mesh to the metal plate as well as to attach the mesh to the surface under repair.

Hoffmann '017 also discloses a two-layer patch. An inner metal plate is covered with adhesive that secures one surface of the plate to the surface under repair. An outer plate cover is laminated onto the exterior side of the metal plate by means of a layer of adhesive applied to the inward-facing side of the plate cover.

In addition to disclosing multi-layered patches, Owens, Hoffmann '391 and Hoffmann '017 share at least one feature. Specifically, all three references teach the application of glue or adhesive to the reinforcing sheet or plate, which is most commonly a piece of thin metal. The application of adhesive to a metal sheet is a costly manufacturing process. Specifically, glues applied to metal sheets must be cured for fifteen to forty-five minutes thereby substantially slowing down the manufacturing process. Further, metal sheeting is not available with glue or adhesive already applied to it. The patch manufacturer must therefore apply the glue or adhesive during the assembly process.

Accordingly, there is a need for a multi-layer patch design with an adhesive-free reinforcing sheet that also allows bonding material, plaster or drywall mud to pass through the repair patch. By providing an adhesive-free reinforcing sheet, the multi-layer patch would be substantially faster and cheaper to manufacture. The result will lower the cost of multi-layer repair patches to the consuming public and therefore broaden the application of multi-layer repair patches.

SUMMARY OF THE INVENTION

The present invention makes a significant contribution to the multi-layer repair patch art by providing a patch incorporating a reinforcing sheet means that does not require a separate application of adhesive thereto. The present invention accomplishes this without compromising the functionality or performance of the multi-layer repair patch and further provides improved, more versatile embodiments of the multi-layer repair patch.

The improved surface repair patch of the present invention includes a thin, deformable yet relatively rigid reinforcing sheet means. The preferred embodiment the sheet means is fabricated from thin, perforated aluminum sheeting although other materials, including but not limited to plastics, may be suitable. As noted above, the sheet means is substantially free of the adhesive and no adhesive needs to be applied to the sheet means during the fabrication of repair patches.

For the purposes of illustration, the inward-facing side of the sheet means is the side of the sheet means intended to cover or be applied to the surface under repair. The outward-facing side of the sheet means faces outward toward the user when the patch is installed.

The sheet means is disposed between an inner mesh means and an outer mesh means. The inward-facing side of the inner mesh means is coated with a pressure-sensitive adhesive material that enables the patch to adhere to the surface under repair. The outward-facing side of the inner mesh means does not require any adhesive applied to it.

The inward-facing side of the outer mesh means is coated with a pressure-sensitive adhesive material as well. The adhesive coating on the inward-facing side of the outer mesh attaches the outer mesh means to the sheet means. In addition, because the inner mesh means and outer mesh means extend beyond the outer periphery of the sheet means, the adhesive disposed on the inward-facing side of the outer mesh means also adheres the outer portion of the outer mesh means to the outer portion of the inner mesh means.

In the preferred embodiment, a pressure-sensitive adhesive is used to coat the inward-facing surfaces of the inner and outer mesh means. A pressure-sensitive adhesive is preferred because only a small amount is needed to coat the inward-facing mesh surfaces and therefore the adhesive does not clog up the mesh or otherwise prevent bonding material, plaster or drywall mud from passing through the repair patch after the repair patch has been mounted on the wall.

Thus, the adhesive on the inward-facing side of the inner mesh means secures the patch to the surface under repair. The adhesive coating disposed on the inward-facing side of the outer mesh means secures the outer mesh means to the sheet means and further holds the sheet means in place because the outer portion of the outer mesh means surrounding the outer periphery of the sheet means is secured to the inner mesh means. Thus, the sheet means is securely sandwiched between the inner and outer mesh means without any application of adhesive to the sheet means.

The present invention also lends itself to an improved method of manufacturing a multi-layer patch assembly. The method includes providing or laying down the inner mesh means with the adhesive-coated side facing downward. The pre-cut sheet means is applied on top or to the adhesive-free side of the inner mesh means. Then, the outer mesh means, with the adhesive-coated side facing downward, is applied to the top of the inner mesh means and the sheet means. The outer and inner mesh means are then cut to defined outer peripheries of the inner and outer mesh means that extend beyond the outer periphery of the pre-cut sheet means thereby providing outer margins of both the inner and outer mesh means that extend beyond the sheet means.

Release paper may be attached to the downward-facing or inward-facing surface of the inner mesh means to protect the adhesive coated thereon.

As noted above, in the preferred embodiments, the sheet means is made of thin aluminum that is rigid and flexible yet deformable thereby enabling the patch to be molded into the desired shape. The use of aluminum is ideal for auto body repair work. In addition, the preferred embodiment includes a perforated or meshed sheet means. The purpose of the perforations or mesh is to enable the transfer of bonding material through the outer mesh means, through the sheet means and finally through the inner mesh means. For example, if the multi-layer patch is intended to cover a whole in a wall, bonding material may be pressed through all three layers of the patch to fill the hole after the patch is applied to the hole. The perforations or mesh of the sheet means also helps to accommodate the bonding material so the user can sculpt a smooth surface thereby successfully hiding the repair. The outer portions or outer margins of the inner and outer mesh means act as a "feathering agent" that make it easier to hide the existence of the patch with smooth coating of bonding materials.

It is therefore an object of the present invention to provide an improved multi-layer patch that requires no application of adhesive to the reinforcing sheet means.

Another object of the present invention is to provide an improved multi-layer patch having drywall, automobile and other repair applications.

Still another object of the present invention is to provide an improved multi-layer repair patch that facilitates the transfer of bonding repair material through the patch and into the damaged area.

Yet another object of the present invention is to provide an improved multi-purpose repair patch that is less expensive to manufacture.

BRIEF DESCRIPTION OF THE DRAWINGS

This invention is illustrated more or less diagrammatically in the accompanying drawings, wherein:

FIG. 1 is an exploded perspective view of an improved repair patch made in accordance with the present invention;

FIG. 2 is a perspective view of the repair patch shown in FIG. 1 and further illustrating the use of release paper applied thereto;

FIG. 3 is a left side view of the repair patch shown in FIG. 2;

FIG. 4 is a perspective view of a section of drywall, showing the improved repair patch of the present invention disposed thereon and covering and repairing a hole in the drywall;

FIG. 5 is an enlarged cross-sectional view taken substantially along line 5—5 of FIG. 3;

FIG. 6 is an exploded perspective view of an alternative repair patch also made in accordance with the present invention;

FIG. 7 is a front elevational view of the repair patch shown in FIG. 6 and also illustrating a sheet of release paper applied thereto;

FIG. 8 is a perspective view of a repair patch made in accordance with the present invention as applied to the hood of an automobile; and FIG. 9 is a cross-sectional view taken substantially along line 9—9 at FIG. 8.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

Like reference numerals will be used to refer to like or similar parts from figure to figure in the following description of the drawings.

The dramatic improvement contributed by the present invention is best understood after consideration of how conventional multi-layer repair patches are manufactured. Typically, a multi-layer repair patch includes a metal reinforcing sheet either disposed between two mesh sheets or the reinforcing sheet is covered with an outer mesh sheet. In either type of patch, glue or adhesive is applied to the metal sheet in order to get it to adhere to the inner mesh sheet or to adhere the metal sheet to the surface under repair. As noted above, the application of glue or adhesive to a metal sheet is time consuming and costly. Metal sheets or metal sheeting does not come with a pre-applied glue or adhesive coating. The manufacturer must apply the glue separately after the metal sheeting is cut to size and then wait fifteen to forty-five minutes for the glue or adhesive to cure. This single step is the longest and most costly step in the manufacture of multi-layer repair patches. By eliminating this costly step, the multi-layer repair patch provided by the present invention provides a substantial improvement to the repair patches known in the art. Repair patches made without separately applying glue or adhesive to the reinforcing sheet will be cheaper to manufacture and therefore cheaper to the consumer. It will most likely result in the use of multi-layer repair patches in new and different applications than known before.

Turning to FIG. 1, the repair patch 10 of the present invention includes three primary components: an inner mesh means 11, a sheet means 12 and an outer mesh means 13. The inner mesh means 11 includes an inwardly-facing side 18 which carries a coating of adhesive. The outwardly facing side 14 (not shown in FIG. 1; see FIG. 3) of the inner mesh means 11 does not require any adhesive. Both the inwardly facing side 27 and the outwardly facing side 15 (not shown in FIG. 1; see FIG. 3) of the sheet means 12 are substantially adhesive-free in the preferred embodiment. That is, no adhesive is intentionally applied to either the inwardly facing side 27 or the outwardly facing side 15 the sheet means 12 prior to fabrication of the patch 10. The outer mesh means 13 also includes an inwardly facing side 26 and an outwardly facing side 16 (not shown in FIG. 1; see FIG. 3). The inwardly facing side 26 of the outer mesh means 13 carries a coating of pressure-sensitive adhesive thereby adhering the inwardly facing side 26 of the outer mesh means 13 to the outwardly-facing side 15 (see FIG. 3) of the sheet means 12 as well as to the outwardly-facing side 14 (see FIG. 3) of the inner mesh means 11. Thus, as will be seen below, the pressure-sensitive adhesive carried by the inwardly-facing side 18 of the inner mesh means 11 adheres the patch 10 to the wall. The sheet means 12 is held in place between the inner mesh means 11 and outer mesh means 13 by the pressure-sensitive adhesive carried by the inwardly-facing side 26 of the outer mesh means 13.

It will be noted that only a light coating of pressure-sensitive adhesive should be applied to the mesh sides 18, 26. The pressure-sensitive adhesive holds the components of the patch 10 together and holds the patch 10 in place on the surface 32. Only a thin coating of pressure-sensitive adhesive is required to achieve this effect. Further, thin coatings of adhesive on the mesh sides 18, 26 prevents any clogging of the mesh 11, 13 which would inhibit the migration of bonding material, plaster or drywall mud through the patch 10. Because only small amounts of pressure-sensitive adhesive are used, there is an insufficient amount of pressure-sensitive adhesive for any migration of adhesive applied to the mesh 13 to the mesh 11 to occur. In other words, the adhesive applied to the inward-facing surface 26 of the mesh 13 holds the mesh 13 against the sheet 12 and against the outward-facing side 14 of the mesh 11. The adhesive applied to the inward-facing side 26 of the mesh 13 does migrate through the patch 10 to the inward-facing side 18 of the mesh 11 or to the inward-facing side 27 of the sheet 12.

FIG. 2 is an illustration of a preferred repair patch 10 prior to use. An optional sheet of release paper 17 may be applied to the inwardly-facing surface 18 of the inner mesh means 11 in order to protect the coating of adhesive applied thereto. The inwardly-facing side 18 of the inner mesh means 11 engages the surface under repair and the adhesive coating applied to the inwardly-facing side 18 of the inner mesh means 11 adheres the patch 10 to the surface. It will be noted in FIGS. 1 and 2 that the sheet means 12 includes perforations 19. The purpose of the perforations 19, is to enable bonding material (not shown in FIGS. 1 or 2) to pass through the outer mesh means 13, the sheet means 12 and through the inner sheet means 11 to fill the hole or dent disposed in the surface under repair.

The path of bonding material (not shown) through the patch 10 is better illustrated in FIG. 3. Turning to the arrows 21, 22, 23, it is seen that bonding material may easily pass through the outer mesh 13 and through the perforations 19 disposed in the sheet means 12 before passing through the inner mesh means 11. FIG. 3 also provides an illustration of how the patch 10 is held together after assembly. The adhesive 24 disposed on the inwardly-facing side 18 of the inner mesh means 11 adheres the patch 10 to the surface under repair. The sheet means 12 carries no adhesive and no adhesive is previously applied to the outwardly-facing surface 14 of the inner mesh means 11. However, the coating of adhesive 25 to the inwardly-facing side 26 of the outer mesh means 13 effectively adheres the outer mesh means 13 to the outwardly-facing side 15 of the sheet means 12 as well as adheres an outer portion of the inwardly-facing side 26 of the outer mesh means 13 to an outer portion of the outwardly-facing side 14 of the inner mesh means 11. Thus, the outer mesh means 13 holds the sheet means in place against the outwardly-facing side 14 of the inner mesh means 11 without applying adhesive to the inwardly-facing side 27 of the sheet means 12.

As seen in FIG. 4, the patch 10 is extremely useful for covering holes 28 disposed in drywall 31 or other surfaces in need of repair. Preferably, the sheet means 12 covers the hole 28 and the outer portions of the inner mesh means 11 and outer mesh means 13 extend outward beyond the sheet means 12 and the hole 28 thereby leaving a substantial "outer margin" of the inwardly-facing side 18 of the inner mesh means 11 to adhere to the surface 32 of the drywall 31.

Turning to FIG. 5, a more detailed illustration of the arrangement shown in FIG. 4 is presented. The hole 28 in the drywall 31 is covered by both the inner mesh means 11 and sheet means 12. Substantial outer margins 33, 34 of the inner mesh means 11 and outer mesh means 13 respectively extend outward beyond the outer periphery defined by the sheet means 12. The outer margin 33 of the inner mesh means 11 enables a suitable surface area of the adhesive-bearing inwardly-facing surface 18 of the inner mesh means 11 to engage the undamaged surface 32 of the drywall 31 thereby enabling a secure attachment of the patch 10 to the drywall 31.

Bonding compound is shown in phantom at 35. Referring to FIGS. 3 and 5 together, the bonding compound 35 may be preapplied in the hole 28 before the patch 10 is applied to the surface 32. After the patch 10 is in place, additional bonding compound may be pressed through the outer mesh means 13, sheet means 12 and inner mesh means 11 as illustrated in FIG. 3 to fill any void spaces left in the hole 28. Therefore, the hole 28 may be completely filled with bonding compound 35 that will harden because air will also pass through the outer and inner mesh means 13, 11 as well as the perforated sheet means 12 to cure any bonding compound disposed behind the patch 10. Thus, the strength of the repair illustrated in FIG. 5 is not limited to the strength of the sheet means 12 covering the hole 28 but may also receive structural support from bonding compound 35 disposed in and through the hole 28. Thus, FIGS. 3 and 5 illustrate the advantages of the perforations 19 in the sheet means 12 as well as the mesh means 11, 13 which cooperatively permit the migration of liquified bonding compound 35 through the patch 10.

FIG. 6 is an alternative illustration of a patch 40 made in accordance with the present invention. The key difference, of course, is the sheet means 42 (compared with the sheet means 12 shown in FIG. 1). The sheet means 42 is essentially a structural mesh. In the preferred embodiment, the mesh 42 is fabricated from aluminum, however, numerous other alternative materials are available. The mesh or sheet means 42 facilitates the transfer of bonding material through the patch 40 and is ideal for automotive repair as shown in FIGS. 8 and 9. The inner mesh means 11 outer mesh means 13 and release paper 17 as shown in FIGS. 1 and 2 are substantially identical to those shown in FIGS. 6 and 7 and hence identical reference numerals are used below. As seen in FIG. 7, the inner mesh means 11 and outer mesh means 13 in combination with the sheet means 42 provides for a very porous structure thereby enabling bonding compound to flow through the patch 40 in a manner very similar to that illustrated in FIG. 3 above.

Turning to FIGS. 8 and 9, a primary advantage of the mesh-like structure of the sheet means 42 is the additional flexibility illustrated in FIGS. 8 and 9. Specifically, irregularly shaped surfaces like a car hood 43 may be repaired with relative ease using the patch 40. Further, as seen in FIG. 9, bonding material 35 may be forced through the patch 40 to engage the damaged surface shown at 44. The embodiment shown in FIGS. 6 through 9 may also be used for drywall purposes as illustrated with respect to FIGS. 1 through 5. Of course, applications in addition to drywall and automobile body repair will be apparent to those skilled in the art.

An additional embodiment contemplated, but not shown in the Figures, would include apertures disposed in the inner and outer mesh means 11, 13 as well as the sheet means 12 or 42. The apertures would be of matching registry and would be ideal for accommodating an element such as a pipe projecting from a surface under repair. The patch would then serve as a seal around the pipe or other projecting element.

The preferred material for manufacturing the inner mesh means 11 and outer mesh means 13 is a fiberglass mesh. However, other materials suitable for fabricating mesh-like structures such as polyester, nylon and other polymer materials may also be used. In addition, a light weight screen-type structure manufactured from metallic or polymer materials may be used to manufacture the inner mesh means 11 and outer mesh means 13. The preferred material for use as the sheet means 12 or sheet means 42 is aluminum or other light weight, flexible and deformable metallic materials. If deformability is not of paramount concern, a plastic sheet means 12 or 42 may be employed. The adhesives for application to the inward-facing surface 18 of the inner mesh means 11 and the inward-facing surface 26 of the outer mesh means 13 are preferably pressure-sensitive adhesives such as National Brand No. 33-4034 or Product No. 72-5405 sold by National Starch and Chemical Corporation of Bridgewater, N.J. These two pressure-sensitive adhesives are polymer emulsions. Product 72-5405 is characterized as an acrylic polymer emulsion. Both adhesives are water soluble. Neither adhesive contains urethane, epoxy or adhesive materials that dry or set-up in a solid or rigid state. Suitable adhesives for the practice of the present invention include pressure-sensitive adhesives that do not cure or otherwise go through a phase change. Such pressure-sensitive adhesives are well known to those skilled in the art. The release paper 17 may be household wax paper or silicone treated paper such as 1-40 BK 6-169 or two-sided released coated kraft paper such as 2-40BKG-1&99 Series kraft paper. Other suitable release papers such as coated kraft papers and wax papers will be known to those skilled in the art. Other suggested materials and manufacturers are listed in U.S. Pat. Nos. 5,075,149, 4,135,017 and 4,707,391.

Although only two preferred embodiments of the present invention have been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

I claim:

1. A three-layer surface repair patch assembly for covering a hole in a wall under repair, the assembly comprising:

a deformable yet relatively rigid sheet means, the sheet means having an inward-facing side and an outward-facing side, both sides of the sheet means being free of adhesive prior to engagement of the sheet means with an inner and outer mesh means, the inward-facing side of the sheet means remaining free of adhesive after engagement of the sheet means with the inner and outer mesh means, the sheet means being disposed between the inner mesh means and the outer mesh means, an inward-facing side of the inner mesh means being coated with pressure-sensitive adhesive material for instantly adhering to the surface to be repaired under manual pressure, an outward-facing side of the inner mesh means being free of adhesive, an inward-facing side of the outer mesh means being coated with pressure-sensitive adhesive material for adhering to an outward-facing side of the sheet means and for adhering an outer margin of the outward-facing side of the inner mesh means under manual pressure, the inner mesh means includes an outer margin disposed between an outer periphery of the sheet means and an outer periphery of the inner mesh means, the outer mesh means includes an outer margin disposed between the outer periphery of the sheet means and an outer periphery of the outer mesh means, the sheet means being held in place when the assembly is attached to a wall by adherence of the sheet means to the inward-facing side of the outer mesh means and by adherence of the outer margin of the outer mesh means to the outer margin of the inner mesh means, no pressure-sensitive adhesive material migrates from the inner mesh means to the inward-facing surface of the sheet means, no pressure-sensitive adhesive material migrates from the outer mesh means to the inward-facing surface of the sheet means, the assembly being held in place when the assembly is attached to the wall by adherence of the inward-facing side of the inner mesh means to the wall.

2. The assembly of claim 1, wherein the sheet means includes perforations permitting a liquified repair material to flow through the outer mesh means, through the sheet means and through the inner mesh means.

3. The assembly of claim 2, wherein the sheet means is fabricated from a metallic material.

4. The assembly claim 3, wherein the metal sheet means is a perforated piece of relatively rigid, non-combustible metal.

5. The assembly of claim 4, wherein the metallic material comprises aluminum.

6. The assembly of claim 5, wherein the aluminum sheet means is approximately 0.12 gauge.

7. The assembly of claim 6, wherein the inner mesh means and outer mesh means are further characterized as fibrous substrates.

8. The assembly of claim 7, wherein the inner mesh means is fabricated from fiberglass mesh.

9. The assembly of claim 8, wherein the outer mesh means is fabricated from fiberglass mesh.

10. The assembly of claim 9, wherein the adhesive attached to the inward-facing sides of the inner mesh means and the outer mesh means is a pressure-sensitive adhesive.

11. The assembly of claim 10, further comprising a release coated sheet removably covering the inward-facing side of the inner mesh means.

12. The assembly of claim 3, wherein the sheet means is further characterized as a flexible metal mesh.

13. The assembly of claim 12, wherein the sheet means, inner mesh means and outer mesh means each contain at least one aperture, the apertures being in matching registry for accommodating an element such as a pipe projecting from a surface to be repaired, whereby the surface surrounding the projecting element may be sealed from weather and insects.

14. A three-layer surface repair patch assembly, the assembly comprising:

a deformable yet relatively rigid sheet means, the sheet means having an inward-facing side and an outward-facing side, both sides of the sheet means being free of adhesive prior to engagement of the sheet means with an inner and outer mesh means, the inward-facing side of the sheet means remaining free of adhesive after engagement of the sheet means with the inner and outer mesh means, the sheet means also including an outer periphery, the inner mesh means including an inward-facing side and outward-facing side, the inward-facing side of the inner mesh means being coated with pressure-sensitive adhesive material for instantly adhering to the surface to be repaired under manual pressure, the outward-facing side of the inner mesh means engaging the inward-facing side of the sheet means, the outward-facing side of the inner mesh means being free of adhesive, the inner mesh means including an outer periphery, the outer periphery of the inner mesh means being disposed beyond the outer periphery of the sheet means and providing the inner mesh means with an outer margin between the outer periphery of the sheet means and the outer periphery of the inner mesh means, an outer mesh means, the outer mesh means including an inward-facing side and an outward-facing side, the outer mesh means also including an outer periphery, the outer periphery of the inner mesh means being disposed beyond the outer periphery of the sheet means and providing the outer mesh means with an outer margin between the outer periphery of the sheet means and the outer periphery of the outer mesh means, the inward-facing side of the outer mesh means being coated with pressure-sensitive adhesive material for instantly adhering to the outward-facing side of the sheet means under manual pressure and for instantly adhering the inward-facing side of the outer margin of the outer mesh means to the outward-facing side of the outer margin of the inner mesh means under manual pressure, the sheet means being held in place when the assembly is attached to a wall by adherence of the outward-facing side of the sheet means to the inward-facing side of the outer mesh means and adherence of the inward-facing side of the outer margin of the outer mesh means to the outward-facing side of the outer margin of the inner mesh means, no pressure-sensitive adhesive material migrates from the inner mesh means to the inward-facing surface of the sheet means, no pressure-sensitive adhesive material migrates from the outer mesh means to the inward-facing surface of the sheet means, the assembly being held in place when the assembly is attached to the wall by adherence of the inward-facing side of the inner mesh means to the wall.

15. The assembly of claim 14, wherein the sheet means includes perforations permitting a liquified bonding material to flow through the outer mesh means, through the sheet means and through the inner mesh means.

16. A method of manufacturing an improved surface repair patch assembly, the method comprising:

providing an inner mesh means, the inner mesh means including an downward-facing side and upward-facing side, the downward-facing side of the inner mesh means being coated with adhesive material for adhering to the surface to be repaired, depositing a thin, deformable yet relatively rigid sheet means on the upward-facing side of the inner mesh means, the sheet means having an downward-facing side and an upward-facing side, both sides of the sheet means being substantially free of adhesive prior to deposit on the inner mesh means, the downward-facing side of the sheet means engaging the upward-facing side of the inner mesh means, the sheet means including an outer periphery, depositing an outer mesh means on the sheet means and the inner mesh means, the outer mesh means including an downward-facing side and an upward-facing side, the downward-facing side of the outer mesh means being coated with an adhesive for adhering to the upward-facing side of the sheet means and for adhering to a portion of the upward-facing side the inner mesh means that extends beyond the outer periphery of the sheet means, a portion of the outer mesh means also extending beyond the outer periphery of the sheet means, cutting the inner mesh means and the outer mesh means to define outer peripheries thereof in matching registry.

17. The method of claim 16, wherein the inner mesh means is provided with release paper attached to the downward-facing side thereof.

18. The method of claim 17, wherein the inner mesh means is initially deposited onto a piece of release paper, the downward-facing side of the inner means adhering to the release paper, the cutting step further defining an outer periphery of the release paper in matching registry with the outer peripheries of the inner and outer mesh means.

\* \* \* \* \*